US009417906B2

(12) United States Patent
Little

(10) Patent No.: US 9,417,906 B2
(45) Date of Patent: Aug. 16, 2016

(54) TRANSACTION PARTICIPANT REGISTRATION WITH CAVEATS

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 928 days.

(21) Appl. No.: 12/752,895

(22) Filed: Apr. 1, 2010

(65) Prior Publication Data

US 2011/0246822 A1 Oct. 6, 2011

(51) Int. Cl.
G06F 17/30 (2006.01)
G06F 9/46 (2006.01)

(52) U.S. Cl.
CPC .......... *G06F 9/466* (2013.01); *G06F 17/30227* (2013.01); *G06F 17/30348* (2013.01)

(58) Field of Classification Search
USPC .................................................. 707/611, 615
See application file for complete search history.

(56) References Cited

U.S. PATENT DOCUMENTS

| | | | |
|---|---|---|---|
| 5,761,721 A | 6/1998 | Baldus et al. | |
| 5,781,910 A * | 7/1998 | Gostanian et al. | 707/610 |
| 6,138,143 A * | 10/2000 | Gigliotti et al. | 709/203 |
| 6,157,927 A * | 12/2000 | Schaefer et al. | |
| 6,286,110 B1 * | 9/2001 | Klein et al. | 714/2 |
| 6,301,601 B1 | 10/2001 | Helland et al. | |
| 6,438,582 B1 * | 8/2002 | Hsiao et al. | 709/206 |
| 6,493,726 B1 | 12/2002 | Ganesh et al. | |
| 6,738,971 B2 | 5/2004 | Chandrasekaran et al. | |
| 7,197,533 B2 | 3/2007 | Vincent et al. | |
| 7,290,056 B1 * | 10/2007 | McLaughlin, Jr. | 709/230 |
| 7,337,441 B2 * | 2/2008 | Felt et al. | 718/101 |
| 7,346,905 B2 * | 3/2008 | Dorrance et al. | 718/104 |
| 7,441,025 B2 | 10/2008 | Felt et al. | |
| 7,818,429 B2 * | 10/2010 | Barghouthi et al. | 709/226 |
| 8,001,548 B2 * | 8/2011 | Groff et al. | 718/104 |
| 8,213,295 B2 | 7/2012 | Ginde | |
| 8,271,448 B2 | 9/2012 | Parkinson et al. | |
| 8,396,961 B2 | 3/2013 | Little | |
| 2001/0011228 A1 | 8/2001 | Shenkman | |
| 2005/0055325 A1 * | 3/2005 | Dutt et al. | 707/1 |
| 2005/0119908 A1 * | 6/2005 | Hippe et al. | 705/1 |
| 2005/0187891 A1 * | 8/2005 | Johnson et al. | 707/1 |
| 2006/0143186 A1 * | 6/2006 | Whyte | 707/10 |
| 2007/0043784 A1 * | 2/2007 | Parkinson | G06F 17/30289 |
| 2007/0072163 A1 * | 3/2007 | Groff et al. | 434/322 |

(Continued)

FOREIGN PATENT DOCUMENTS

GB 2335516 A1 9/1999

OTHER PUBLICATIONS

"Two-phase commit optimizations and tradoffs in the commercial environment", George Samaras et al., IEEE 1993.*

(Continued)

*Primary Examiner* — Miranda Huang
(74) *Attorney, Agent, or Firm* — Lowenstein Sandler LLP

(57) ABSTRACT

In a distributed computing system, a processing device executing a caveat enabled transaction manager registers one or more transaction participants with the transaction manager. To register a transaction participant, the caveat enabled transaction manager records an address of the transaction participant. The caveat enabled transaction manager additionally determines whether the transaction participant is associated with any transaction caveats. If the transaction participant is associated with a transaction caveat, the caveat enabled transaction manager records the transaction caveat.

24 Claims, 6 Drawing Sheets

(56) References Cited

U.S. PATENT DOCUMENTS

| | | |
|---|---|---|
| 2008/0034082 A1 | 2/2008 | McKinney |
| 2008/0046608 A1 | 2/2008 | Lee et al. |
| 2008/0062863 A1 | 3/2008 | Ginde |
| 2008/0312998 A1* | 12/2008 | Templeton et al. ............ 705/7 |
| 2010/0223217 A1 | 9/2010 | Little |
| 2011/0055376 A1 | 3/2011 | Little |

OTHER PUBLICATIONS

Abdallah, M., et al., "One-phase commit: does it make sense?", Parallel and Distributed Systems, 1998, Proceedings, 1998 International Conference, Dec. 14-16, 1998 pp. 182-192.

"JBoss Transactions 4.2.3, JTS Programmers Guide", Apr. 4, 2007, 117 pages.

Johnson, Rod, et al., "Spring java/j2ee Application Framework, The Spring Framework—Reference Documentation", Version 2.5.6, © 2008, 590 pages.

Lampson, Butler and Lomet, David, "A New Presumed Commit Optimization for Two Phase Commit", Cambridge Research Laboratory, Technical Report Series, Feb. 10, 1993, 26 pages.

Samaras, George, et al., "Two-Phase Commit Optimizations and Tradeoffs in the Commercial Environment", IBM Distributed Systems Architecture, IBM Almaden Research Center, © 1993, pp. 520-529.

JBOSS Inc, J Boss Transactions 4.2.3, JTS Programmers Guide, Apr. 4, 2007, 117 pages.

* cited by examiner

TRANSACTION PARTICIPANT REGISTRATION WITH CAVEATS

TECHNICAL FIELD

Embodiments of the present invention relate to distributed transactions, and more specifically to using transaction caveats to improve the efficiency of distributed transactions.

BACKGROUND

Distributed transactions are often performed on distributed computing systems. Herein, a distributed computing system that performs distributed transactions is referred to as a distributed transaction system. A distributed transaction is a set of operations that update shared objects. Distributed transactions must satisfy the properties of Atomicity, Consistency, Isolation and Durability, known commonly as the ACID properties. According to the Atomicity property, either the transaction successfully executes to completion, and the effects of all operations are recorded, or the transaction fails. The Consistency property requires that the transaction does not violate integrity constraints of the shared objects. The Isolation property requires that intermediate effects of the transaction are not detectable to concurrent transactions. Finally, the Durability property requires that changes to shared objects due to the transaction are permanent.

To ensure the Atomicity property, all participants of the distributed transaction must coordinate their actions so that they either unanimously abort or unanimously commit to the transaction. A two-phase commit protocol is commonly used to ensure Atomicity. Under the two-phase commit protocol, the distributed transaction system performs the commit operation in two phases. In the first phase, commonly known as the prepare phase or request phase, a coordinator node (a node in the distributed transaction system managing the transaction) asks all participant nodes whether they are willing to commit to the transaction. During the second phase, commonly known as the commit phase, the coordinator node determines whether the transaction should be completed. If during the prepare phase all participant nodes committed to the transaction, the coordinator node successfully completes the transaction. If during the prepare phase one or more participant nodes failed to commit to the transaction, the coordinator node does not complete the transaction.

Distributed transaction systems include one or more transaction managers that coordinate a transaction. When a transaction is initiated, a transaction manager registers each of the services, clients, applications and/or other entities that will participate in the transaction. In conventional transaction systems, such registration consists solely of recording an address of each of the transaction participants. Transaction managers of conventional transaction systems are not capable of recording additional information about transaction participants at the time of participant registration.

BRIEF DESCRIPTION OF THE DRAWINGS

The present invention is illustrated by way of example, and not by way of limitation, in the figures of the accompanying drawings and in which.

DETAILED DESCRIPTION

Figure 1:
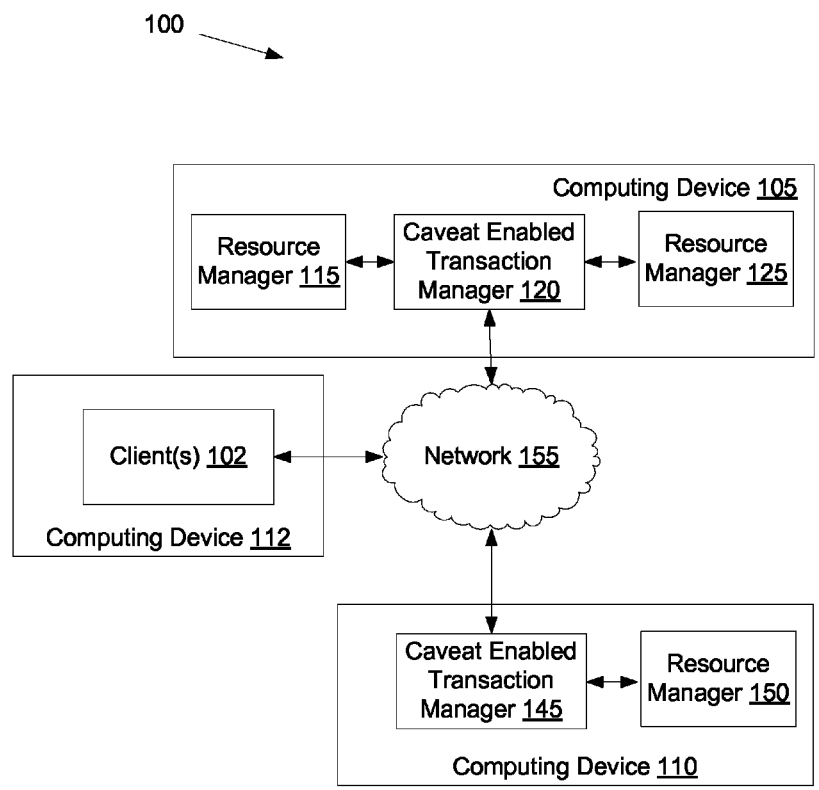
FIG. 1 illustrates an exemplary distributed transaction system, in which embodiments of the present invention may operate.

Described herein is a method and apparatus for optimizing distributed transaction systems through the use of transaction caveats. In one embodiment, a processing device executing a caveat enabled transaction manager (referred to herein interchangeably as a CETM or simply transaction manager) registers one or more transaction participants with the transaction manager. To register a transaction participant, the transaction manager records an address of the transaction participant. The transaction manager additionally determines whether the transaction participant is associated with any transaction caveats. If the transaction participant is associated with a transaction caveat, the transaction manager records the transaction caveat. During a two-phase commit distributed transaction, the transaction manager can make decisions on whether to commit or rollback a transaction based in part on the transaction caveats. In some situations, the recorded transaction caveats enable the transaction manager to more efficiently manage distributed transactions.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "registering", "recording", "managing", "determining", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, or flash memory device.

FIG. 1 illustrates an exemplary distributed transaction system 100, in which embodiments of the present invention may operate. The distributed transaction system 100 may include a service oriented architecture (SOA), which is an information system architecture that organizes and uses distributed capabilities (services) for one or more applications. An SOA provides a uniform means to offer, discover, interact with and use capabilities (services) distributed over a network. Through the SOA, applications may be designed that combine loosely coupled and interoperable services. In one embodiment, the distributed transaction system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. In one embodiment, the ESB is a single bus that logically interconnects all available services and clients. Alternatively, the ESB may include multiple buses, each of which may logically interconnect different services and/or clients.

The distributed transaction system 100 includes multiple computing devices (e.g., computing device 105, computing device 110 and computing device 112), which are connected via a network 155. Each of the computing devices 105, 110, 112 may be personal computers (PC), palm-sized computing devices, personal digital assistants (PDA), mobile phones, server computers such as rackmount servers, or other computing devices. Each of the computing devices 105, 110, 112 may host services, applications and/or other functionality that is available to clients on the distributed transaction system 100. Two or more of the computing devices 105, 110, 112 may be coupled in a cluster configuration or in a non-cluster configuration. The network 155 may be a private network (e.g., local area network (LAN), wide area network (WAN), intranet, etc.), a public network (e.g., the Internet), or a combination thereof.

In one embodiment, computing device 112 includes one or more clients 102. Additionally, computing device 105 and computing device 110 may also include one or more clients. Client(s) 102 may be applications or programs run on a computing device. In the SOA, client(s) 102 include applications that access services such as transactional resources. Client(s) 102 may be fat clients (client that performs local processing and data storage), thin client (client that performs minimal or no local processing and minimal to no data storage), and/or hybrid clients (client that performs local processing but little to no data storage). In one embodiment, clients 102 are applications that implement transactional operations (e.g., programs that initiate business transactions). Clients 102 may direct a transaction manager to create and demarcate transactions, may propagate transaction context, and may operate on data via resource managers.

In one embodiment, computing device 105 includes caveat enabled transaction manager 120 and computing device 110 includes caveat enabled transaction manager 145. Computing device 112 may also include a transaction manager. A transaction manager is a component that coordinates (acts as a transaction coordinator for) multiple participants during a distributed transaction. A caveat enabled transaction manager is a transaction manager that can use transaction caveats to optimize distributed transactions. Exemplary transaction caveats are described in greater detail below with reference to FIG. 2.

A participant may be another transaction manager (e.g., from another computing device), a local resource manager (e.g., resource manager 115 and resource manager 125 are local resource managers for transaction manager 120), a client application (e.g., client 102), or other entity. Coordinating a distributed transaction may include assigning identifiers to the transaction, registering participants of the transaction, monitoring progress of the transaction, taking responsibility for transaction completion, and providing fault recovery for the transaction. Taking responsibility for transaction completion may include determining whether each participant can commit to a transaction, directing each participant to commit if all participants can commit to the transaction, and directing each participant to rollback if not all participating nodes are able to commit.

Any transaction manager in the distributed transaction system 100 is capable of operating as a transaction coordinator. A transaction manager 120, 145 may act as a transaction coordinator when a client 102 requests that the transaction manager 120, 145 initiate a transaction. The transaction manager may be located on the same computing device as the requesting client, on the computing device of one or more resources that will participate in the transaction, or on another computing device. Moreover, a transaction manager can hand responsibility over to another transaction manager, causing the other transaction manager to become the transaction coordinator for a particular distributed transaction.

In one embodiment, computing device 105 includes multiple resource managers 115 and 125, and computing device 110 also includes a resource manager 150. Computing device 112 may also include one or more resource managers, and computing device 110 may include multiple resource managers. A resource manager is a component that manages a persistent and stable storage system. Examples of resource managers include databases and file managers. Each resource manager 115, 125, 150 may act as a participant in a distributed transaction for a resource associated with that resource manager. Each resource manager 115, 125, 150 may include an interface for operating on the data maintained by the resource manager (e.g., by clients 102) and another interface for interacting with the transaction manager and participating in distributed transactions. Some or all of the resource managers 115, 125, 150 may be caveat enabled resource managers. A caveat enabled resource manager is a resource manager that includes one or more transaction caveats, which are discussed below with reference to FIG. 2.

Each resource manager 115, 125, 150 may maintain an undo log (log of committed changes that occur during a distributed transaction) and/or redo log (log of uncommitted changes that occur during a distributed transaction). The redo logs and/or undo logs can be used to rollback any changes that occurred during a distributed transaction if the transaction is aborted. These logs may also include an identifier of the coordinator of the transaction, an address of the coordinator, an identification of the transaction, a process identification of a process that started the transaction, a description of the transaction, identification of other participants of the transaction, a timestamp indicating when the transaction was started and/or additional data.

Figure 2:
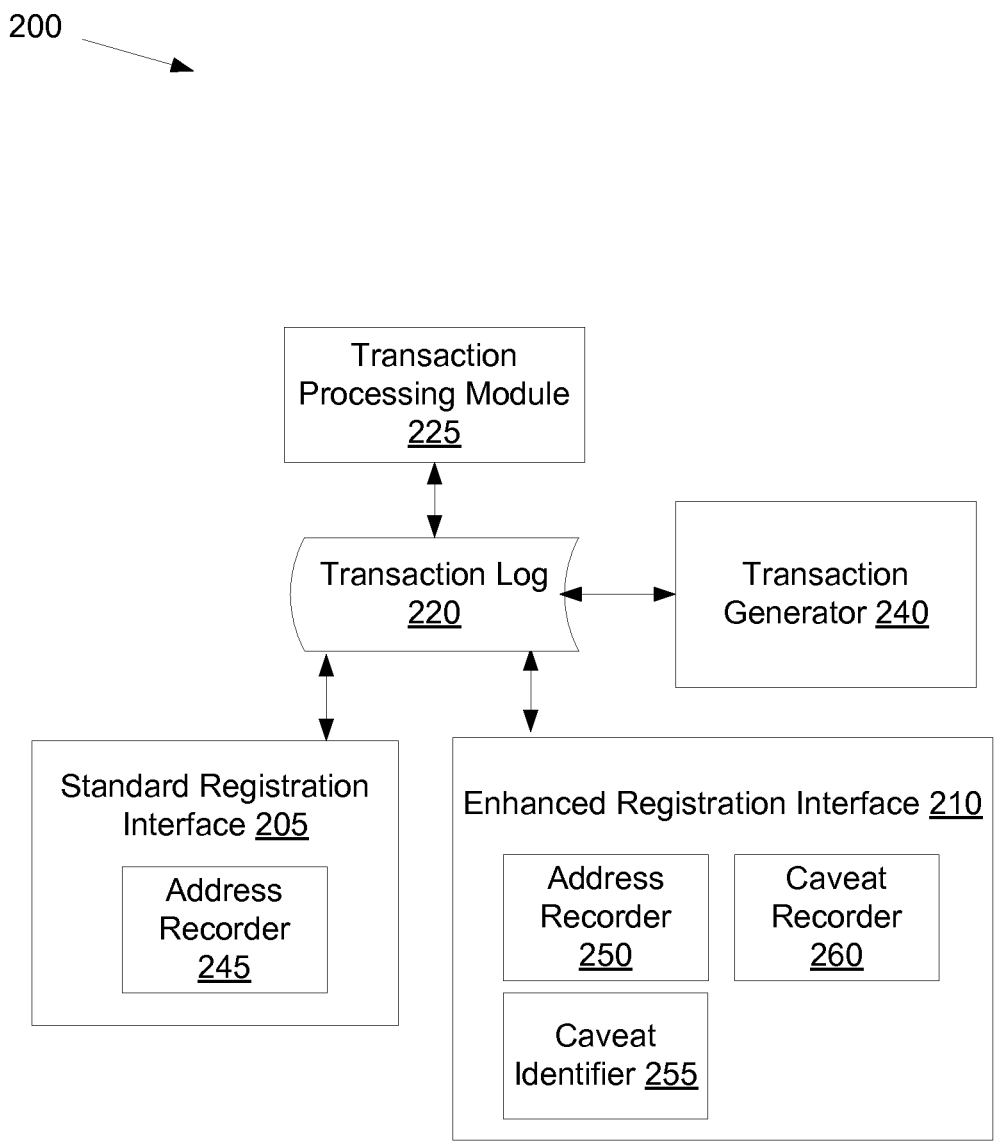
FIG. 2 illustrates a block diagram of a caveat enabled transaction manager, in accordance with one embodiment of the present invention.

FIG. 2 illustrates a block diagram of a caveat enabled transaction manager (referred to herein as CETM or just transaction manager for simplicity) 200, in accordance with one embodiment of the present invention. The transaction manager 200 may correspond to CETM 120 and/or CETM 145 of FIG. 1. In one embodiment, the CETM 200 includes a standard registration interface 205, an enhanced registration interface 210, a transaction generator 240 and a transaction processing module 225.

When the transaction manager 200 receives a request (e.g., from a client) to initiate a new transaction, the transaction generator 240 generates the new transaction, the new transaction having a unique transaction identifier. Since multiple clients and/or resources may participate in a transaction, the new transaction has a transaction context, which is associated with the transaction identifier. The transaction context provides an association between transactional operations on the resources and the clients or services invoking those operations. The transaction identifier is sent to the entity (e.g., client) that requested the transaction. The requestor (e.g., client) may then send the transaction identifier to each entity (e.g., additional client, application, resource manager, etc.) that will be a participant to the transaction. Alternatively, the requestor may notify transaction manager 200 of the participants, and transaction manager 200 may send the transaction identifier to each of the identified participants.

The transaction manager 200 maintains a log of active transactions for which that transaction manager acts as a transaction coordinator. In one embodiment, the transaction generator 240 generates a transaction log 220 for each new transaction. The transaction generator 240 may record in a transaction log 220 an identification of the transaction associated with the log (e.g., a transaction identification number), a process identification of the process (e.g., client) that initiated the transaction, a description of the transaction, a timestamp identifying when the transaction was started and/or additional data.

Once a transaction is generated, the transaction manager 200 performs participant registration (also known as resource enlistment). Any resources that will be modified, accessed, or otherwise affected by the transaction are registered with the transaction via either the standard registration interface 205 or the enhanced registration interface 210. Client applications may also register with the transaction. Each resource and/or client application that will participate in the transaction may inform the transaction manager 200 of their participation in the transaction by providing the transaction identifier to the transaction manager 200 and requesting registration to the transaction associated with the provided transaction identifier. Alternatively, the client that requested the transaction may identify to the transaction manager 200 each of the resources and/or additional applications that should be enlisted, and the transaction manager 200 may add those participants to the transaction without first receiving registration requests from those participants.

Standard registration interface 205 is used to enlist/register transaction participants that are not configured to handle transaction caveats. For example, legacy applications and/or resources may enlist in the transaction using the standard registration interface. The standard registration interface 205 includes an address recorder 245 that registers a participant to a transaction by adding an entry for the participant in the transaction log 220 associated with the transaction. Alternatively, the address recorder 245 may record the participant's address into a separate participant log associated with the transaction. The participant's address may be a universal resource locator (URL), a common object resource broker architecture (CORBA) interoperable internet object protocol (IIOP) reference, an internet protocol address and/or port address, and/or other form of electronic address.

Enhanced registration interface 210 is used to enlist/register participants that include transaction caveats. A transaction caveat is a statement that identifies how a participant will behave regarding a transaction under particular circumstances. For example, transaction caveats may include timeout transaction caveats that specify actions that a participant will take if a transaction fails to be resolved prior to a timeout period and/or crash recovery transaction caveats that specify actions that a participant will take upon recovering from a system crash. Transaction caveats act as cautionary details that the transaction manager can consider when evaluating whether to commit or rollback a transaction, how to distribute commands to participants, and/or how to otherwise manage a transaction.

Enhanced registration interface 210 includes an address recorder 250, a caveat identifier 255 and a caveat recorder 260. Address recorder 250 records participant addresses to transaction log 220 (or to a participant log) as described above with reference to address recorder 245. Caveat identifier 255 identifies what caveats, if any, are associated with a participant. The participant notifies the caveat identifier 255 of the transaction caveats used by the participant. This may be in response to the caveat identifier 255 polling the participant for transaction caveats, or may be reported along with participant address by the participant without the caveat identifier 255 sending a query to the participant (e.g., when the participant requests to be enlisted in the transaction via the enhanced registration interface 210). Caveat recorder 260 records any identified transaction caveats in the transaction log 220. In one embodiment, the identified transaction caveats are recorded in an entry for the participant along with the participant's address.

A participant may have one or multiple transaction caveats. Each transaction caveat identifies whether the transaction participant will commit to a transaction or rollback a transaction given a particular set of circumstances. One type of transaction caveat is a timeout transaction caveat. A timeout transaction caveat specifies a time period after which the associated participant will automatically rollback or commit to a distributed transaction. For example, a timeout transaction caveat may specify that the associated participant will automatically rollback any transactions that are not completed within 30 seconds of when the transactions begin.

Another type of transaction caveat is a crash recovery transaction caveat. A crash recovery transaction caveat specifies that if the participant crashes (e.g., the machine hosting the participant crashes or just the participant crashes), when the participant recovers from the crash, the participant will automatically commit to the transaction or rollback the transaction. Participants may also include other types of transaction caveats.

Transaction processing module 225 is responsible for actually coordinating a distributed transaction. The transaction processing module 225 administers the two-phase commit transaction protocol. Accordingly, during a prepare phase of a two-phase commit distributed transaction, the transaction processing module 225 sends a commit query to each participant asking whether the participant can commit to the transaction. If the participant can commit to the transaction, it sends a commit response back to the transaction coordinator. If the participant cannot commit to the transaction, it sends an abort response (also known as a rollback response) to the transaction coordinator. During a commit phase of a two-phase commit distributed transaction, the transaction processing module 225 sends a commit command to each participant if all participants indicated that they were able to commit. Each participant then commits to the transaction and sends a confirmation to the transaction coordinator that the transaction was successfully completed. If one or more of the participants sent an abort response, then the transaction processing module 225 sends an abort command to each participant during the commit phase. Each participant then rolls back the transaction, and may send a confirmation to the transaction coordinator that the transaction was rolled back. Messages such as the commit query, commit command and rollback command are sent to participants using the participant's addresses that are recorded in the transaction log 220.

Transaction processing module 225 may use the transaction caveats in the transaction log 220 to optimize how a transaction is coordinated. For example, consider a transaction having a first participant with a timeout transaction caveat that specifies that the associated participant will automatically rollback a transaction if not completed in 30 seconds and additional participants that do not include any timeout transaction caveats. Once all participants have sent commit responses to the transaction manager 200, the transaction processing module 225 may determine that a commit command should be sent to the first participant before sending the commit command to other participants to ensure that the first participant will not automatically rollback the transaction. Additionally, if responses have not been received from all participants before the 30 second time period, then transaction processing module 225 knows that the first transaction participant has already rolled back the transaction. Thus, the transaction processing module 225 may send abort (rollback) commands to the participants before receiving commit or rollback responses from all of the participants.

Consider another example, in which a first transaction participant includes a crash recovery transaction caveat specifying that the transaction participant will automatically rollback the transaction upon recovery. At any point during a distributed transaction, one or more participants may fail/crash. If the transaction manager 200 detects that the first transaction participant has crashed, then the transaction processing module 225 may automatically rollback the transaction without receiving commit or rollback responses from all participants. Thus, transaction caveats can cause transactions to complete (commit or rollback) sooner than they would otherwise complete, increasing their efficiency.

Figure 3:
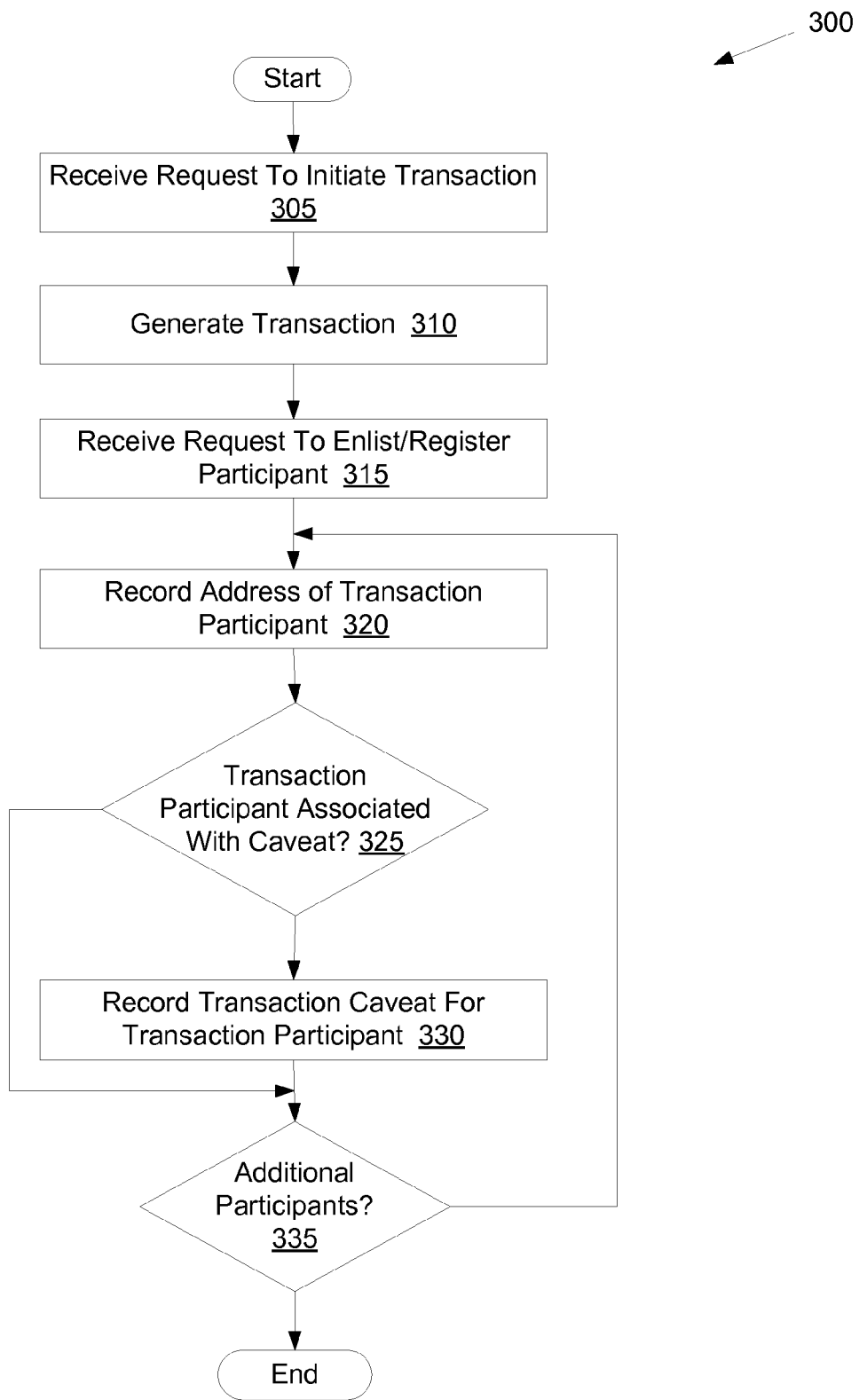
FIG. 3 illustrates a flow diagram of one embodiment for a method of initiating a distributed transaction.

FIG. 3 illustrates a flow diagram of one embodiment for a method 300 of initiating a distributed transaction. The method is performed by processing logic that comprises hardware (e.g., circuitry, dedicated logic, programmable logic, microcode, etc.), software (such as instructions run on a processing device), or a combination thereof. In one embodiment, method 300 is performed by caveat enabled transaction manager 200 of FIG. 2.

Referring to FIG. 3, at block 305 a transaction manager receives a request to initiate a transaction. The request may be received from a client application by the transaction manager. At block 310, the transaction manager generates a new transaction. This includes creating a transaction identifier and transaction context for the new transaction. The transaction manager then sends the transaction identifier for the new transaction to the requestor, which may be a client application. The requestor can propagate the transaction identifier to each of the resource managers and/or additional client applications that will participate in the transaction. These resource managers and/or additional client applications can then request to be enlisted/registered in the new transaction based on providing the transaction identifier for the new transaction.

At block 315, the transaction manager receives a request to enlist/register a transaction participant to the transaction. In one embodiment, the request includes the transaction identifier to identify the transaction that the participant will participate in. The request may also include an address of the participant and one or more transaction caveats associated with the participant.

At block 320, the transaction manager records an address of the transaction participant. At block 325, the transaction manager determines whether the transaction participant is associated with a transaction caveat 325. If the transaction participant is associated with a transaction caveat, the method continues to block 330, and the transaction manager records the transaction caveat for the transaction participant. The transaction caveat and participant address may be included in an entry of a transaction log maintained by the transaction manager. If the transaction participant is not associated with a transaction caveat, the method proceeds to block 335. At block 335, the transaction manager determines whether there are any additional participants to add to the transaction (e.g., if the transaction manager has received any requests to register additional participants). If there are additional participants to enlist in the transaction, the method returns to block 320 for the next participant. Otherwise, the method ends.

Figure 4:
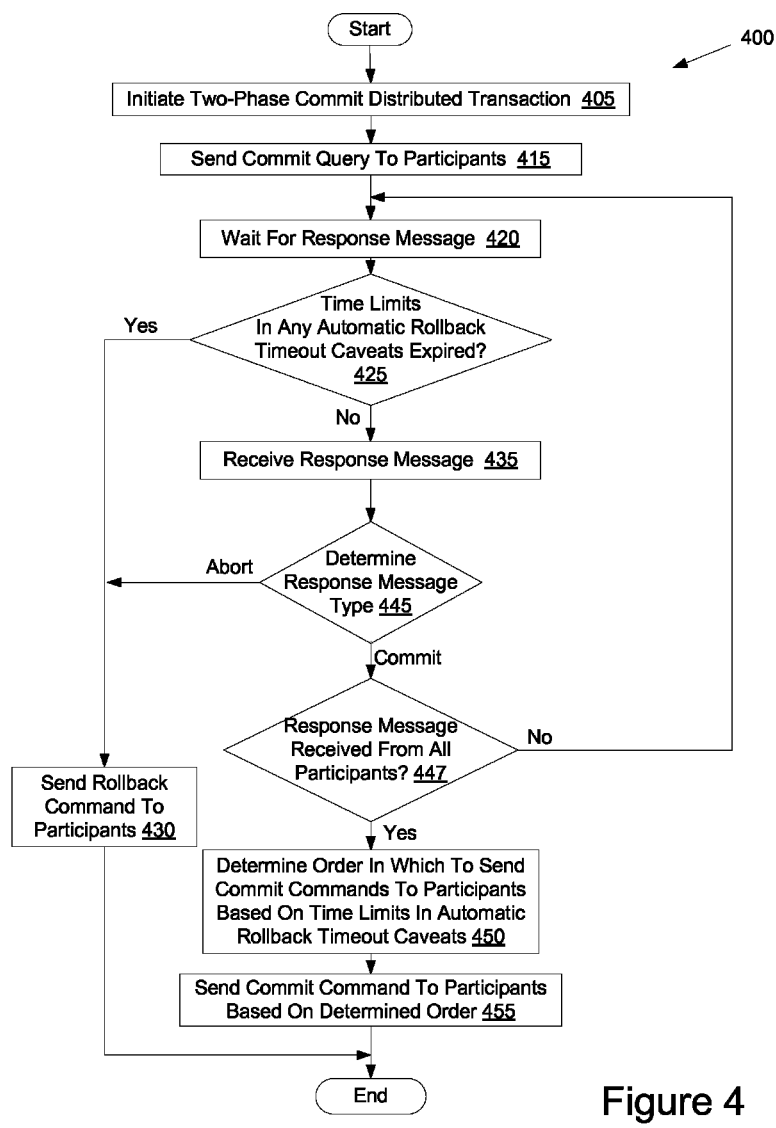
FIG. 4 illustrates a flow diagram of one embodiment for a method of coordinating a distributed transaction.
Figure 5:
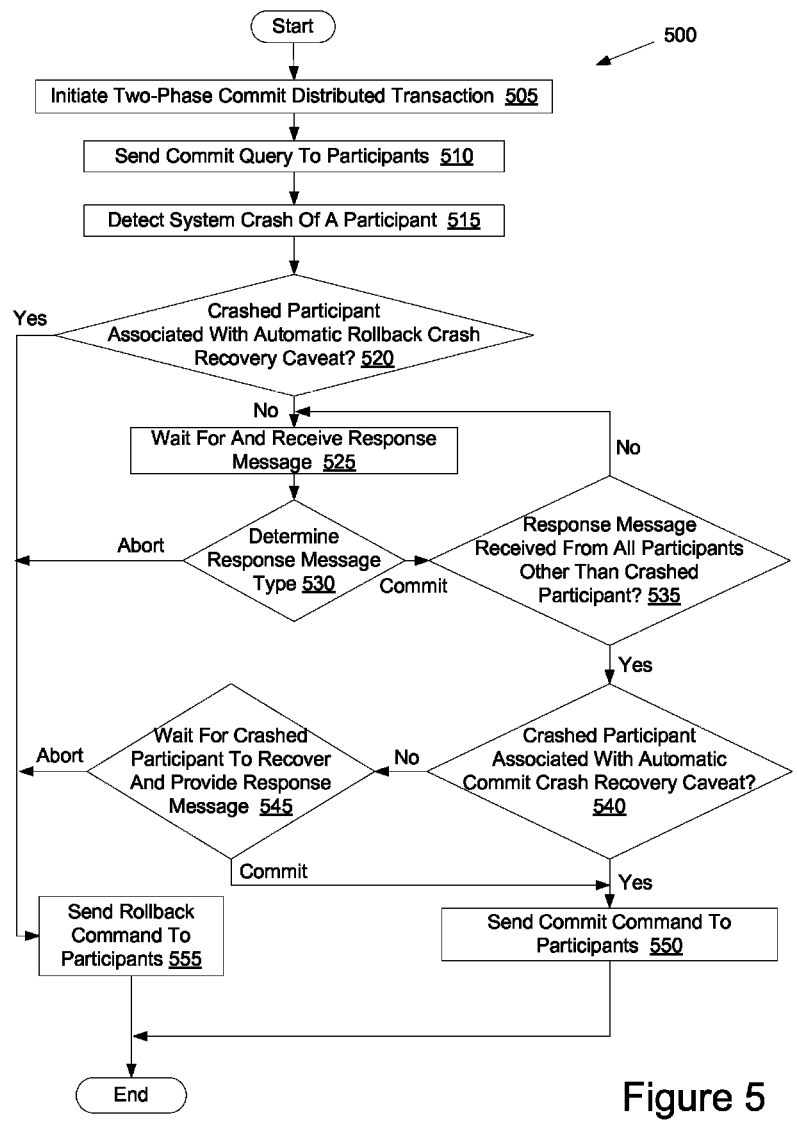
FIG. 5 illustrates a flow diagram of another embodiment for a method of coordinating a distributed transaction.

Once participants have been registered in a transaction, if any of those participants were registered with transaction caveats, the transaction manager can use those transaction caveats in managing the transaction. Use of the transaction managements to manage a transaction can reduce rollbacks due to transaction timeouts, reduce transaction pendency, and otherwise optimize transactions. FIGS. 4 and 5 below discuss multiple embodiments in which transactions are managed using transaction caveats.

FIG. 4 illustrates a flow diagram of one embodiment for a method 400 of coordinating a distributed transaction. The method is performed by processing logic that comprises hardware (e.g., circuitry, dedicated logic, programmable logic, microcode, etc.), software (such as instructions run on a processing device), or a combination thereof. Method 400 is performed after all participants have been registered with the distributed transaction (e.g., after completion of method 300). In one embodiment, method 400 is performed by caveat enabled transaction manager 200 of FIG. 2.

Referring to FIG. 4, at block 405 a transaction manager initiates a two-phase commit distributed transaction. At block 415, the transaction manager sends commit queries to each participant of the transaction. At block 420, the transaction manager waits to receive response messages (e.g., commit responses or rollback/abort responses).

At block 425, the transaction manager determines whether any time limits included in any automatic rollback caveats have expired. If a time limit of a timeout caveat specifying that the associated participant will roll back the transaction has expired, then it is known that the associated participant has already rolled back the transaction. Thus, there is no need to wait for commit or rollback responses from participants. Under such circumstances, the method proceeds to block 430, and the transaction is rolled back. This includes sending rollback commands to the participants. In one embodiment, a rollback command is not sent to the participant having an automatic rollback timeout caveat that has expired, since it has already unilaterally rolled back the transaction. Rollback commands also may not be sent to any participants that have automatic rollback timeout caveats that have time limits that have not expired, since they will unilaterally rollback the transaction when their time limits expire.

If at block 425 no automatic rollback timeout caveats have time limits that have expired, the method continues to block 435. At block 435, the transaction manager receives a response message. At block 445, the transaction manager then determines whether the received response message is an abort/rollback response or a commit response. If the received response is an abort response, the method proceeds to block 430 and the transaction is rolled back. If the received response is a commit response, the method continues to block 447.

At block 447, the transaction manager determines whether response messages have been received from all registered participants. If response messages have not been received from all transaction participants, the method returns to block 420 to await additional response messages. If commit responses have been received from all participants, the method continues to block 450.

Any transaction participants having automatic rollback timeout caveats will automatically roll back the transaction, even after sending a commit response, if they do not receive a commit command from the transaction manager before the timeout period (before the time limit has expired). Accordingly, at block 450, the transaction manager determines an order in which to send commit commands to participants based on time limits in automatic rollback transaction caveats. The order may be determined by prioritizing participants based on the transaction caveats, and ordering the participants in descending order of priority (e.g., so that the participant having the highest priority is ordered first, and so on). In one embodiment, transaction participants having automatic rollback timeout caveats are prioritized over participants that do not have such caveats. Additionally, participants that have the shortest timeout periods for their automatic rollback timeout caveats are prioritized higher than participants that have longer timeout periods. At block 455, the transaction manager sends commit commands to the participants based on the determined order, which may be based on a determined prioritization of the participants. This minimizes the risk that any transaction participants will unilaterally rollback the transaction before its completion.

FIG. 5 illustrates a flow diagram of another embodiment for a method 500 of coordinating a distributed transaction. The method is performed by processing logic that comprises hardware (e.g., circuitry, dedicated logic, programmable logic, microcode, etc.), software (such as instructions run on a processing device), or a combination thereof. Method 500 is performed after all participants have been registered with the distributed transaction (e.g., after completion of method 300). In one embodiment, method 500 is performed by caveat enabled transaction manager 200 of FIG. 2.

Referring to FIG. 5, at block 505 a transaction manager initiates a two-phase commit distributed transaction. At block 510, the transaction manager sends commit queries to each participant of the transaction. At block 515, the transaction manager detects a system crash of a participant. The system crash may be a crash of the computing device hosting the participant, of the operating system on which the participant runs, or of the participant itself.

At block 520, the transaction manager determines whether the crashed participant is associated with an automatic rollback crash recovery caveat. If the participant is associated with an automatic rollback crash recovery caveat, then the transaction manager knows that upon recovery from the system crash, the participant will abort or rollback the transaction. Thus, if the crashed participant is associated with an automatic rollback crash recovery caveat, the method continues to block 555, and the transaction manager rolls back the transaction. This includes sending rollback commands to the participants. In one embodiment, a rollback command is not sent to the crashed participant, since the crashed participant will automatically rollback the transaction upon recovery.

If at block 520 the crashed participant is not associated with an automatic rollback crash recovery caveat, the method continues to block 525. At block 525, the transaction manager waits for a response message until a response message is received (or potentially until a timer times out). At block 530, the transaction manager then determines whether the received response message is an abort/rollback response or a commit response. If the received response is an abort response, the method proceeds to block 555 and the transaction is rolled back. If the received response is a commit response, the method continues to block 535.

At block 535, the transaction manager determines whether response messages have been received from all registered participants. If response messages have not been received from all transaction participants, the method returns to block 525 to await additional response messages. If commit responses have been received from all participants, the method continues to block 540.

At block 540, the transaction manager determines whether the crashed participant is associated with an automatic commit crash recovery caveat. If the participant is associated with an automatic commit crash recovery caveat, then the transaction manager knows that upon recovery from the system crash, the participant will issue a commit response for the transaction. Thus, if the crashed participant is associated with an automatic commit crash recovery caveat, the method continues to block 550, and the transaction manager commits the transaction. This includes sending commit commands to each of the participants, including the crashed participant. The commit command is sent to the crashed participant once that participant recovers from the crash.

If at block 540 the crashed participant is not associated with an automatic commit crash recovery caveat, the method proceeds to block 545. At block 545, the transaction manager waits for the crashed participant to recover and provide a response message. If the response message is an abort response, the method continues to block 555, and the transaction is aborted. If the response message is a commit response, the method continues to block 550, and the transaction manager commits the transaction.

Method 500 can significantly reduce the pendency of distributed transactions where a transaction participant has experienced a system crash.

Figure 6:
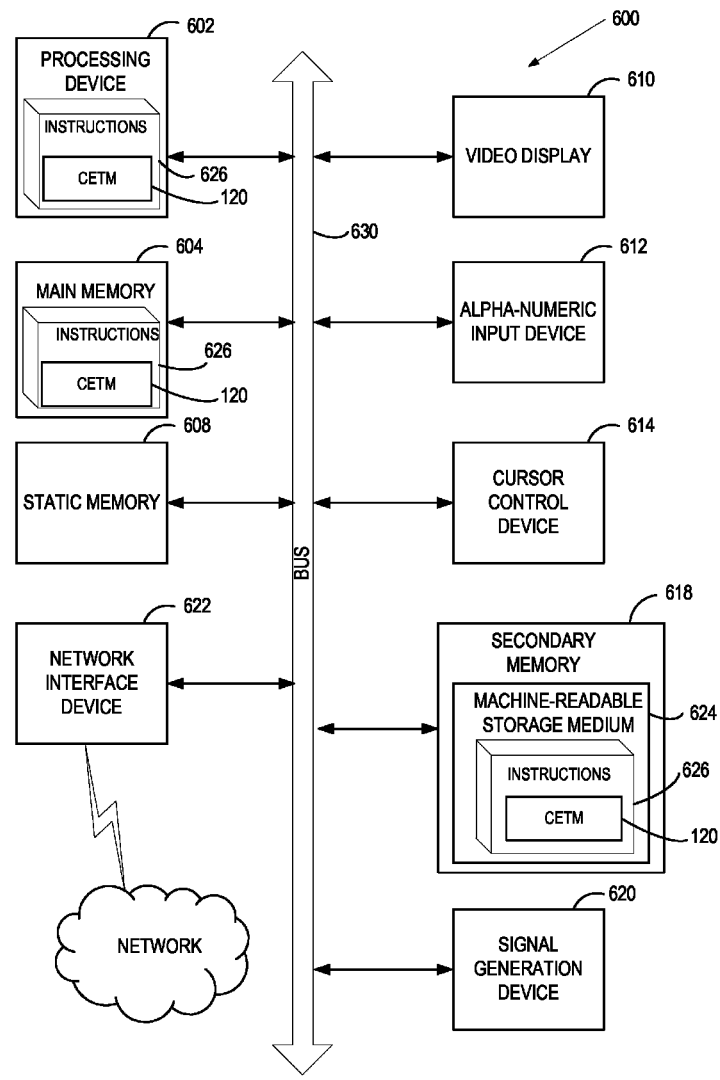
FIG. 6 illustrates a block diagram of an exemplary computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 608 (e.g., flash memory, static random access memory (SRAM), etc.), and a secondary memory 618 (e.g., a data storage device), which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute processing logic (e.g., instructions 626) for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 618 may include a machine-readable storage medium (or more specifically a computer-readable storage medium) 624 on which is stored one or more sets of instructions 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

The machine-readable storage medium 624 may also be used to store a caveat enabled transaction manager (CETM) (e.g., CETM 200 of FIG. 2) and/or a software library containing methods that call a CETM. While the machine-readable storage medium 624 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    registering, by a processing device executing a transaction manager, a plurality of transaction participants of a transaction with the transaction manager before initiating the transaction, wherein registering at least one transaction participant of the plurality of transaction participants comprises:
        recording an address of the transaction participant;
        determining that the transaction participant is associated with a transaction caveat, wherein the transaction caveat comprises data that identifies an action the transaction participant to take regarding the transaction under at least one of:
            first circumstances that will cause the transaction participant to commit to the transaction if the first circumstances are later realized during the transaction; or
            second circumstances that will cause the transaction participant to roll back the transaction if the second circumstances are later realized during the transaction; and
        recording the transaction caveat associated with the transaction participant;
    initiating a prepare phase of the transaction after completing the registering, wherein the prepare phase is initiated before initiating a commit phase of the transaction; and
    managing the transaction for the plurality of registered transaction participants using the transaction caveat.

2. The method of claim 1, the method further comprising:
    sending a commit query to each of the plurality of registered transaction participants by the transaction manager;
    receiving commit responses from each of the plurality of registered transaction participants;
    determining an order in which to send commit commands to the plurality of transaction participants based on the transaction caveat; and
    sending the commit commands to the plurality of transaction participants in the determined order.

3. The method of claim 1, wherein the transaction caveat is a timeout transaction caveat that specifies that the transaction participant associated with the transaction caveat will automatically roll back the transaction if the transaction is not completed within a predetermined time period.

4. The method of claim 3, further comprising:
identifying by the transaction manager that the transaction has not completed within the predetermined time period; and
sending roll back messages to the plurality of transaction participants before receiving commit or abort responses from all of the plurality of transaction participants.

5. The method of claim 3, wherein one of the plurality of transaction participants is an application that interfaces with a user, the method further comprising:
notifying the application that the transaction must complete within the predetermined time period, wherein the application notifies the user to commit to the transaction within the predetermined time period.

6. The method of claim 1, wherein the transaction caveat is a crash recovery transaction caveat that indicates that the transaction participant will automatically roll back the transaction upon recovering from a system crash, the method further comprising:
detecting that the transaction participant associated with the crash recovery transaction caveat has experienced a system crash; and
rolling back the transaction in response to detecting the system crash.

7. The method of claim 1, wherein the transaction caveat is a crash recovery transaction caveat that indicates that the transaction participant will automatically commit to the transaction upon recovering from a system crash, the method further comprising:
detecting that the transaction participant associated with the crash recovery transaction caveat has experienced a system crash;
receiving commit responses from all of the plurality of transaction participants other than the transaction participant that experienced the system crash; and
committing the transaction without receiving a commit response from the transaction participant that experienced the system crash.

8. The method of claim 1, wherein a first registration interface is used to register transaction participants that are not associated with transaction caveats and a second registration interface is used to register transaction participants that are associated with transaction caveats.

9. A non-transitory computer-readable storage medium including instructions that, when executed by a processing device, cause the processing device to:
register, by a transaction manager running on the processing device, plurality of transaction participants with the transaction manager before initiating a transaction, wherein registering at least one transaction participant of the plurality of transaction participants comprises:
recording an address of the transaction participant;
determining that the transaction participant is associated with a transaction caveat, wherein the transaction caveat comprises data that identifies an action the transaction participant to take regarding the transaction under at least one of:
first circumstances that will cause the transaction participant to commit to the transaction if the first circumstances are later realized during the transaction; or
second circumstances that will cause the transaction participant to roll back the transaction if the second circumstances are later realized during the transaction; and
recording the transaction caveat associated with the transaction participant;

initiate a prepare phase of the transaction after completing the registering, wherein the prepare phase is initiated before initiating a commit phase of the transaction; and
manage the transaction for the plurality of registered transaction participants using the transaction caveat.

10. The non-transitory computer-readable storage medium of claim 9, wherein the instructions further cause the processing device to:
send a commit query to each of the plurality of registered transaction participants by the transaction manager;
receive commit responses from each of the plurality of registered transaction participants;
determine an order in which to send commit commands to the plurality of transaction participants based on the transaction caveat; and
send the commit commands to the plurality of transaction participants in the determined order.

11. The non-transitory computer-readable storage medium of claim 9, wherein the transaction caveat is a timeout transaction caveat that specifies that the transaction participant associated with the transaction caveat will automatically roll back the transaction if the transaction is not completed within a predetermined time period.

12. The non-transitory computer-readable storage medium of claim 11, wherein the instructions further cause the processing device to:
identify by the transaction manager that the transaction has not completed within the predetermined time period; and
send roll back messages to the plurality of transaction participants before receiving commit or abort responses from all of the plurality of transaction participants.

13. The non-transitory computer-readable storage medium of claim 11, wherein one of the plurality of transaction participants is an application that interfaces with a user, and wherein the instructions further cause the processing device to:
notify the application that the transaction must complete within the predetermined time period, wherein the application notifies the user to commit to the transaction within the predetermined time period.

14. The non-transitory computer-readable storage medium of claim 9, wherein the transaction caveat is a crash recovery transaction caveat that indicates that the transaction participant will automatically roll back the transaction upon recovering from a system crash, and wherein the instructions further cause the processing device to:
detect that the transaction participant associated with the crash recovery transaction caveat has experienced a system crash; and
roll back the transaction in response to detecting the system crash.

15. The non-transitory computer-readable storage medium of claim 9, wherein the transaction caveat is a crash recovery transaction caveat that indicates that the transaction participant will automatically commit to the transaction upon recovering from a system crash, and wherein the instructions further cause the processing device to:
detect that the transaction participant associated with the crash recovery transaction caveat has experienced a system crash;
receive commit responses from all of the plurality of transaction participants other than the transaction participant that experienced the system crash; and
commit the transaction without receiving a commit response from the transaction participant that experienced the system crash.

16. The non-transitory computer-readable storage medium of claim 9, wherein a first registration interface is used to register transaction participants that are not associated with transaction caveats and a second registration interface is used to register transaction participants that are associated with transaction caveats.

17. A system comprising:
a memory to store instructions for a transaction manager; and
a processing device, connected to the memory, to execute the instructions, wherein the instructions cause the processing device to:
perform registration of a plurality of transaction participants to the transaction manager before initiating a transaction, wherein to register at least one transaction participant of the plurality of transaction participants the processing device records an address of the transaction participant, determines that the transaction participant is associated with a transaction caveat that identifies an action the transaction participant to take regarding the transaction under at least one of first circumstances that will cause the transaction participant to commit to the transaction if the first circumstances are later realized during the transaction or second circumstances that will cause the transaction participant to roll back the transaction if the second circumstances are later realized during the transaction, and records the transaction caveat associated with the transaction participant;
initiate a prepare phase of the transaction after completing the registration, wherein the prepare phase is initiated before initiating a commit phase of the transaction; and
manage the transaction for the plurality of registered transaction participants using the transaction caveat.

18. The system of claim 17, wherein the instructions further to cause the processing device to:
send a commit query to each of the plurality of registered transaction participants by the transaction manager;
receive commit responses from each of the plurality of registered transaction participants;
determine an order in which to send commit commands to the plurality of transaction participants based on the transaction caveat; and
send the commit commands to the plurality of transaction participants in the determined order.

19. The system of claim 17, wherein the transaction caveat is a timeout transaction caveat that specifies that the transaction participant associated with the transaction caveat will automatically roll back the transaction if the transaction is not completed within a predetermined time period.

20. The system of claim 19, further comprising the instructions to cause the processing device to:
identify that the transaction has not completed within the predetermined time period; and
send roll back messages to the plurality of transaction participants before receiving commit or abort responses from all of the plurality of transaction participants.

21. The system of claim 19, wherein one of the plurality of transaction participants is an application that interfaces with a user, the instructions further to cause the processing device to:
notify the application that the transaction must complete within the predetermined time period, wherein the application notifies the user to commit to the transaction within the predetermined time period.

22. The system of claim 17, wherein the transaction caveat is a crash recovery transaction caveat that indicates that the transaction participant will automatically roll back the transaction upon recovering from a system crash, the instructions further to cause the processing device to:
detect that the transaction participant associated with the crash recovery transaction caveat has experienced a system crash; and
roll back the transaction in response to detecting the system crash.

23. The system of claim 17, wherein the transaction caveat is a crash recovery transaction caveat that indicates that the transaction participant will automatically commit to the transaction upon recovering from a system crash, the instructions further to cause the processing device to:
detect that the transaction participant associated with the crash recovery transaction caveat has experienced a system crash;
receive commit responses from all of the plurality of transaction participants other than the transaction participant that experienced the system crash; and
commit the transaction without receiving a commit response from the transaction participant that experienced the system crash.

24. The system of claim 17, wherein a first registration interface is used to register transaction participants that are not associated with transaction caveats and a second registration interface is used to register transaction participants that are associated with transaction caveats.

* * * * *